Oct. 2, 1928.  
G. E. LEAR  
BROODER HEATER  
Filed May 23, 1927

1,685,879

Inventor  
G. E. Lear  
By Lacey & Lacey, Attorneys

Patented Oct. 2, 1928.

1,685,879

UNITED STATES PATENT OFFICE.

GEORGE E. LEAR, OF DANVILLE, ALABAMA.

BROODER HEATER.

Application filed May 23, 1927. Serial No. 193,664.

The present invention is directed to improvements in brooder heaters.

The primary object of the invention is to provide a device of this character constructed in such manner that water may be used for maintaining the interior of the brooder at a uniform temperature.

Another object of the invention is to provide a brooder so constructed that the interior thereof can be heated by water, the construction being such that the temperature of the water can be conveniently regulated at a point exteriorly of the brooder.

Another object of the invention is to provide a novel form of water heater, which is extremely simple in construction, efficient in operation and one which can be manufactured at a very small cost.

Figure 1:
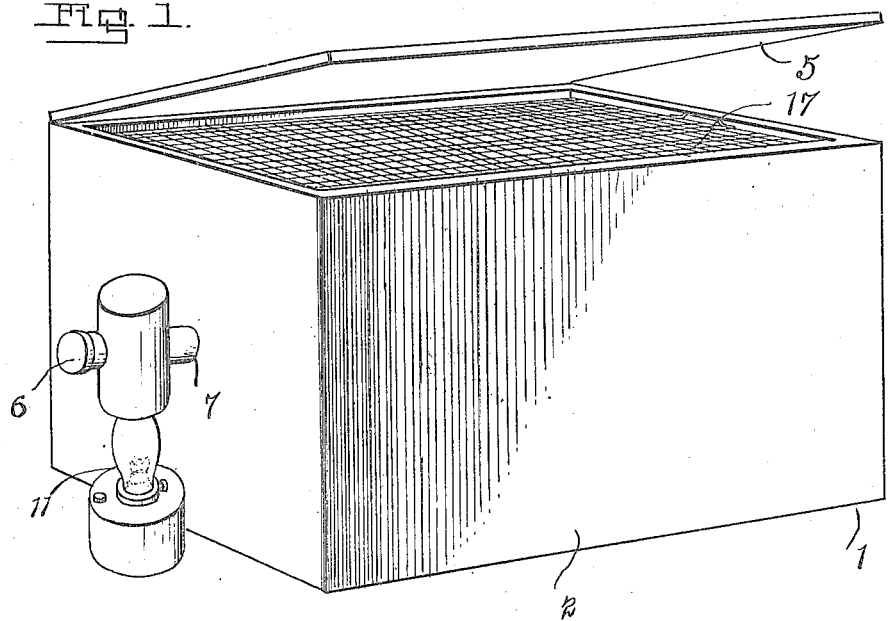
Figure 1 is a perspective view of the device.
Figure 2:
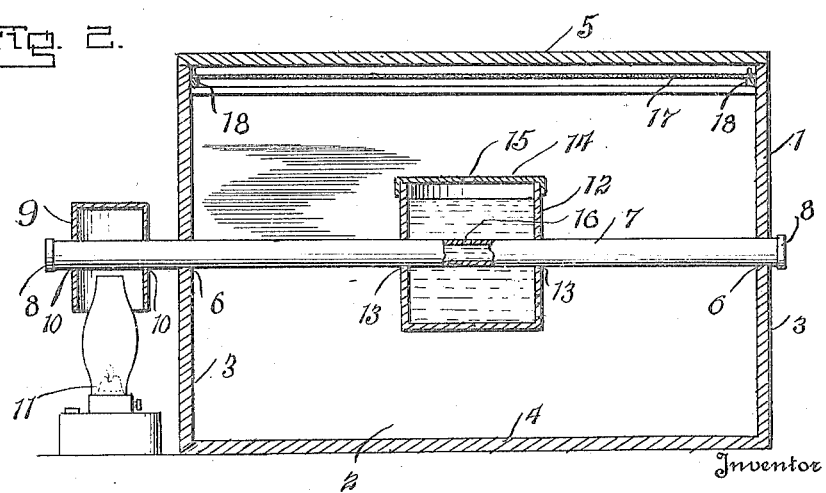
Figure 2 is a longitudinal sectional view therethrough.

Referring to the drawing, 1 designates the brooder which comprises a casing including side walls 2, end walls 3, bottom 4, and a hingedly connected top 5.

The end walls have openings 6 therein and in which are engaged the ends of a tube 7, having its respective ends closed by caps 8, one end of the tube being extended somewhat beyond the associated end wall. A heat retaining receptacle 9 is provided and has its side walls formed with alined openings 10 for engaging the extended end of the tube 7. This receptacle serves to trap the heat from the lamp 11 which is so positioned that the heat from the chimney will enter the receptacle.

A water containing tank 12 is supported by the tube so as to be located centrally within the brooder casing, said tank having openings 13 in its side wall for the reception of the tube, there being a removable top 14 carried by the tank and in which is formed a vent 15.

The tube 7 is provided with an orifice 16 which communicates with the interior of the tank in order that water poured into the tank will slowly enter the tube and displace the air therein as the water is poured into the tank. After the tube is full the water may be poured more rapidly.

It will be obvious that the heat from the lamp will heat the water in the tube 7 as well as the water in the tank, thus heating the interior of the brooder to promote the growth of the chicks therein.

The temperature of the water can be conveniently regulated upon adjusting the wick of the lamp, as will be obvious.

A supplemental wire mesh cover 17 may be provided to close the upper end of the brooder casing when the top 5 is open to prevent the entrance of rats and other animals.

The supplemental cover, as shown, is supported upon cleats 18 but if desired the same can be easily connected to the casing. The casing may be lined with any suitable material and may be provided with partitions if it is deemed necessary.

Having thus described the invention, I claim:

A brooder comprising a casing, a tube supported by the end walls of the casing and having one end extended beyond one end wall, a heat trapping receptacle mounted upon the extended end, a water tank supported by the tube, said tube having an orifice therein for communication with the tank, and a heating unit associated with the receptacle for heating water in the tube and thus the water in the tank.

In testimony whereof I affix my signature.

GEORGE E. LEAR. [L. S.]